(12) United States Patent
Vembu et al.

(10) Patent No.: US 10,367,639 B2
(45) Date of Patent: Jul. 30, 2019

(54) GRAPHICS PROCESSOR WITH ENCRYPTED KERNELS

(71) Applicant: Intel Corporation, Santa Clara, CA (US)

(72) Inventors: Balaji Vembu, Folsom, CA (US); Vidhya Krishnan, Folsom, CA (US); Sandeep S. Sodhi, Folsom, CA (US); Scott Janus, Rocklin, CA (US); Daniel Nemiroff, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 247 days.

(21) Appl. No.: 15/394,324

(22) Filed: Dec. 29, 2016

(65) Prior Publication Data

US 2018/0191494 A1 Jul. 5, 2018

(51) Int. Cl.
| | | |
|---|---|---|
| *H04L 9/14* | (2006.01) | |
| *G06F 21/74* | (2013.01) | |
| *G06F 21/75* | (2013.01) | |

(52) U.S. Cl.
CPC ............ *H04L 9/14* (2013.01); *G06F 21/74* (2013.01); *G06F 21/75* (2013.01)

(58) Field of Classification Search
CPC ......... H04L 9/0838; G06F 21/74; G06F 21/75
USPC ....................................................... 713/164
See application file for complete search history.

(56) References Cited

U.S. PATENT DOCUMENTS

| | | | | |
|---|---|---|---|---|
| 5,029,206 A | * | 7/1991 | Marino, Jr. ........... | G06F 21/602 380/277 |
| 5,537,544 A | * | 7/1996 | Morisawa ............... | G06F 21/31 713/183 |
| 6,704,871 B1 | * | 3/2004 | Kaplan ................... | G06F 21/72 713/192 |
| 7,634,629 B2 | | 12/2009 | Demiroff et al. | |
| 7,636,441 B2 | | 12/2009 | Vembu | |
| 7,787,629 B1 | * | 8/2010 | Belenko ................. | G06F 21/72 380/286 |
| 7,825,915 B2 | | 11/2010 | Choi et al. | |
| 7,868,897 B2 | | 1/2011 | Vembu et al. | |
| 7,908,476 B2 | * | 3/2011 | Kandasamy ........ | G06F 21/6218 707/821 |
| 8,014,530 B2 | | 9/2011 | Brickell et al. | |
| 8,705,729 B2 | | 4/2014 | Wong et al. | |
| 8,726,346 B2 | | 5/2014 | Wang et al. | |
| 8,971,530 B2 | | 3/2015 | Nemiroff | |
| 9,100,693 B2 | | 8/2015 | Vembu et al. | |
| 9,158,916 B2 | | 10/2015 | Nemiroff et al. | |
| 9,208,355 B1 | * | 12/2015 | Areno ..................... | G06F 21/73 |
| 9,319,224 B2 | | 4/2016 | Nemiroff et al. | |

(Continued)

OTHER PUBLICATIONS

"GPUVerify: a Verifier for GPU Kernels", retrieved from multicore. doc.ic.ac.uk/tools/GPUVerify/, 2 pages.

(Continued)

*Primary Examiner* — Shahriar Zarrineh

(74) *Attorney, Agent, or Firm* — Jordan IP Law, LLC

(57) ABSTRACT

An embodiment of a graphics apparatus may include a graphics processor including a kernel executor, and a security engine communicatively coupled to the graphics processor. The security engine may be configured to create a kernel security key, encrypt an executable kernel for the kernel executor in accordance with the kernel security key, and share the kernel security key with the graphics processor.

20 Claims, 12 Drawing Sheets

(56) References Cited

U.S. PATENT DOCUMENTS

| | | | | |
|---|---|---|---|---|
| 9,519,803 B2* | 12/2016 | Dewan | | G06F 21/64 |
| 2002/0007456 A1* | 1/2002 | Peinado | | G06F 21/10 |
| | | | | 713/164 |
| 2002/0164022 A1* | 11/2002 | Strasser | | H04N 7/1675 |
| | | | | 380/201 |
| 2003/0126434 A1* | 7/2003 | Lim | | G06F 21/6218 |
| | | | | 713/164 |
| 2003/0212890 A1* | 11/2003 | Dircks | | G06F 21/604 |
| | | | | 713/164 |
| 2004/0174998 A1* | 9/2004 | Youatt | | H04N 7/1675 |
| | | | | 380/210 |
| 2004/0254876 A1* | 12/2004 | Coval | | G06Q 40/04 |
| | | | | 705/37 |
| 2006/0242409 A1* | 10/2006 | Reneris | | H04L 9/0841 |
| | | | | 713/168 |
| 2007/0067624 A1* | 3/2007 | England | | G06F 21/6218 |
| | | | | 713/164 |
| 2007/0268297 A1* | 11/2007 | Novosad | | G06F 21/125 |
| | | | | 345/501 |
| 2007/0294512 A1* | 12/2007 | Crutchfield | | G06F 8/443 |
| | | | | 712/200 |
| 2008/0012874 A1* | 1/2008 | Spangler | | G06T 15/005 |
| | | | | 345/582 |
| 2008/0046756 A1* | 2/2008 | Dempski | | G06F 21/84 |
| | | | | 713/187 |
| 2009/0031128 A1* | 1/2009 | French | | G06F 21/6218 |
| | | | | 713/164 |
| 2009/0249066 A1* | 10/2009 | Lu | | G06F 21/445 |
| | | | | 713/164 |
| 2010/0123729 A1* | 5/2010 | Stam | | G09G 5/395 |
| | | | | 345/545 |
| 2010/0332852 A1 | 12/2010 | Vembu et al. | | |
| 2011/0169844 A1* | 7/2011 | Diard | | G06F 9/451 |
| | | | | 345/522 |
| 2012/0102333 A1* | 4/2012 | Wong | | G06F 21/10 |
| | | | | 713/189 |
| 2012/0173877 A1* | 7/2012 | Pendakur | | G06F 21/123 |
| | | | | 713/169 |
| 2012/0216046 A1* | 8/2012 | McDougal | | G06F 21/56 |
| | | | | 713/183 |
| 2012/0320070 A1* | 12/2012 | Arvo | | G06F 9/5033 |
| | | | | 345/522 |
| 2013/0002689 A1* | 1/2013 | Panneer | | G06T 1/20 |
| | | | | 345/506 |
| 2013/0132944 A1* | 5/2013 | Davis | | G06F 9/44521 |
| | | | | 718/1 |
| 2014/0032933 A1* | 1/2014 | Smith | | G06F 21/6209 |
| | | | | 713/193 |
| 2014/0004747 A1 | 2/2014 | Janus et al. | | |
| 2014/0047470 A1* | 2/2014 | Janus | | H04N 21/2541 |
| | | | | 725/30 |
| 2014/0055465 A1* | 2/2014 | Diercks | | G06T 1/20 |
| | | | | 345/506 |
| 2014/0092091 A1* | 4/2014 | Li | | G06T 15/60 |
| | | | | 345/423 |
| 2014/0123235 A1* | 5/2014 | Dewan | | G06F 21/53 |
| | | | | 726/4 |
| 2014/0157423 A1* | 6/2014 | Edelsten | | G06F 21/10 |
| | | | | 726/26 |
| 2014/0208047 A1 | 7/2014 | Vembu et al. | | |
| 2015/0086012 A1* | 3/2015 | Chhabra | | H04N 21/4122 |
| | | | | 380/200 |
| 2015/0097431 A1* | 4/2015 | Tan | | H01L 23/645 |
| | | | | 307/31 |
| 2015/0134971 A1* | 5/2015 | Park | | H04L 9/0863 |
| | | | | 713/189 |
| 2016/0028699 A1* | 1/2016 | Ambroz | | H04L 63/0428 |
| | | | | 713/168 |
| 2016/0056961 A1* | 2/2016 | Gueron | | H04L 9/3226 |
| | | | | 713/183 |
| 2016/0142202 A1* | 5/2016 | Dai Zovi | | H04L 9/0819 |
| | | | | 380/28 |
| 2016/0253520 A1* | 9/2016 | Moon | | G06F 21/72 |
| | | | | 713/190 |
| 2016/0364559 A1* | 12/2016 | Bali | | G06F 21/32 |
| 2017/0060637 A1* | 3/2017 | Persson | | G06F 9/468 |
| 2017/0061408 A1* | 3/2017 | Choi | | G06Q 20/1085 |
| 2017/0140148 A1* | 5/2017 | Gleeson | | G06F 21/125 |
| 2017/0178274 A1* | 6/2017 | Venkatesh | | G06F 9/46 |
| 2017/0178277 A1* | 6/2017 | Sharma | | G06T 1/20 |
| 2017/0178398 A1* | 6/2017 | Afra | | G06T 15/80 |
| 2018/0075584 A1* | 3/2018 | Akenine-Moller | | G09G 5/30 |
| 2018/0121368 A1* | 5/2018 | Apodaca | | G06F 12/126 |
| 2018/0165092 A1* | 6/2018 | Du | | G06F 9/30123 |

OTHER PUBLICATIONS

Vasiliadis et al., "PixelVault: Using GPUs for Securing Cryptographic Operations", retrieved from syssec-project.eu/m/page-media/3/ccsfp314s-vasiliadis.pdf, 12 pages.

* cited by examiner

US 10,367,639 B2

GRAPHICS PROCESSOR WITH ENCRYPTED KERNELS

TECHNICAL FIELD

Embodiments generally relate to graphics processing. More particularly, embodiments relate to a graphics processor with encrypted kernels.

BACKGROUND

A graphics processor unit (GPU) may include a render engine. The render engine may be able to load executable kernels to provide specialized processing of graphics contents. Some graphics contents may include protected content which may include rights management features.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
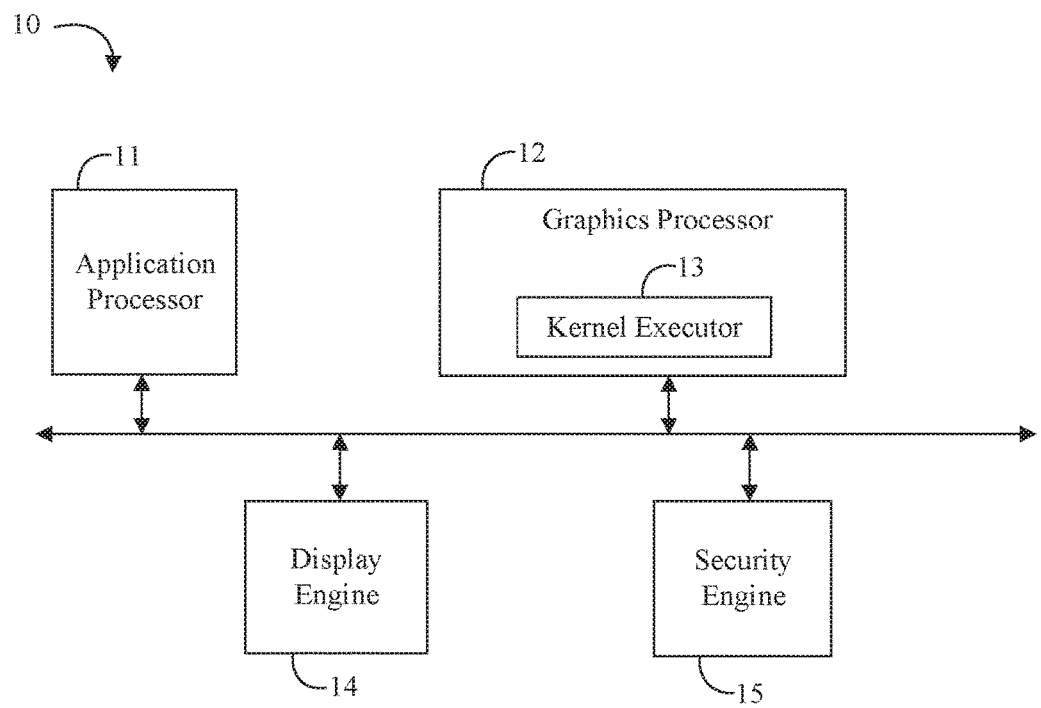
FIG. 1 is a block diagram of an example of an electronic processing system according to an embodiment.

Turning now to FIG. 1, an embodiment of an electronic processing system 10 may include an application processor 11, a graphics processor 12 communicatively coupled to the application processor 11, the graphics processor 12 including a kernel executor 13, a display engine 14 communicatively coupled to the graphics processor 12, and a security engine 15 communicatively coupled to the graphics processor 12 and the display engine 14. For example, the security engine 15 may be configured to decrypt protected content in accordance with a content title key, create a display security key, share the display security key with the graphics processor 12 and the display engine 14, create a kernel security key, encrypt an executable kernel for the kernel executor 13 in accordance with the kernel security key, and share the kernel security key with the graphics processor 12.

In some embodiments of the system 10, the graphics processor 12 may be further configured to provide access to the kernel executor 13 for protected content only in a specified mode, and force decryption of any executable kernel loaded onto the kernel executor 13 in the specified mode in accordance with the kernel security key. For example, the graphics processor 12 may include a render engine having a plurality of kernel executors 13, and each of the plurality of kernel executors 13 may be forced to decrypt any executable kernel loaded thereon in the specified mode in accordance with the kernel security key. In some embodiments, the security engine 15 may be further configured to retrieve a signed and encrypted kernel, decrypt and verify the signed and encrypted kernel, and encrypt only a verified kernel with the kernel security key.

Embodiments of each of the above application processor 11, graphics processor 12, kernel executor 13, display engine 14, security engine 15, and other components of the electronic processing system 10 may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or in fixed-functionality logic hardware using circuit technology such as, for example, application specific integrated circuit (ASIC), complementary metal oxide semiconductor (CMOS) or transistor-transistor logic (TTL) technology, or any combination thereof. Alternatively, or additionally, some operational aspects of these components may be implemented in one or more modules as a set of logic instructions stored in a machine- or computer-readable storage medium such as RAM, read only memory (ROM), programmable ROM (PROM), firmware, flash memory, etc., to be executed by a processor or computing device. For example, computer program code to carry out the operations of the components may be written in any combination of one or more operating system applicable/appropriate programming languages, including an object oriented programming language such as PYTHON, PERL, JAVA, SMALLTALK, C++, C# or the like and conventional procedural programming languages, such as the "C" programming language or similar programming languages.

Figure 2:
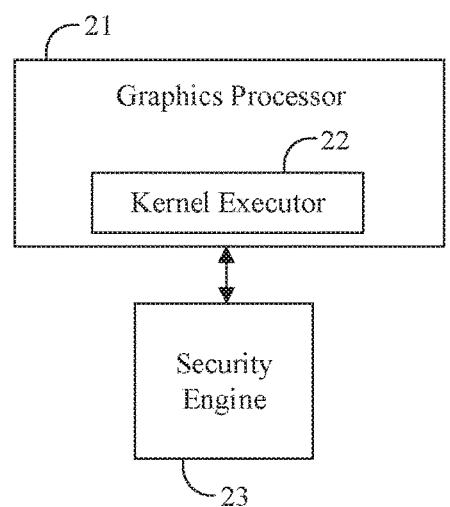
FIG. 2 is a block diagram of an example of a graphics apparatus according to an embodiment.
Figure 3A:
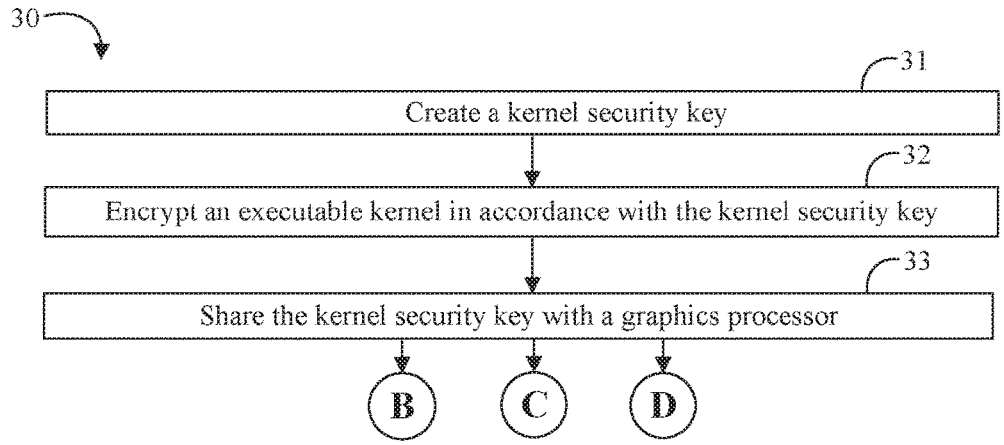
FIGS. 3A to 3D are flowcharts of an example of a method of protecting graphics content according to an embodiment.
Figure 3B:
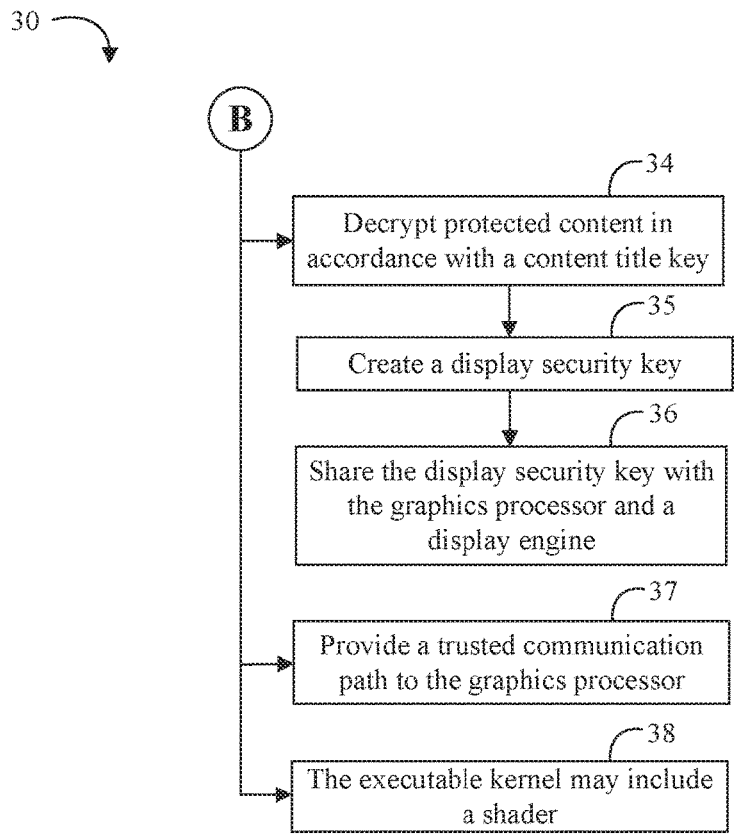
Figure 3C:
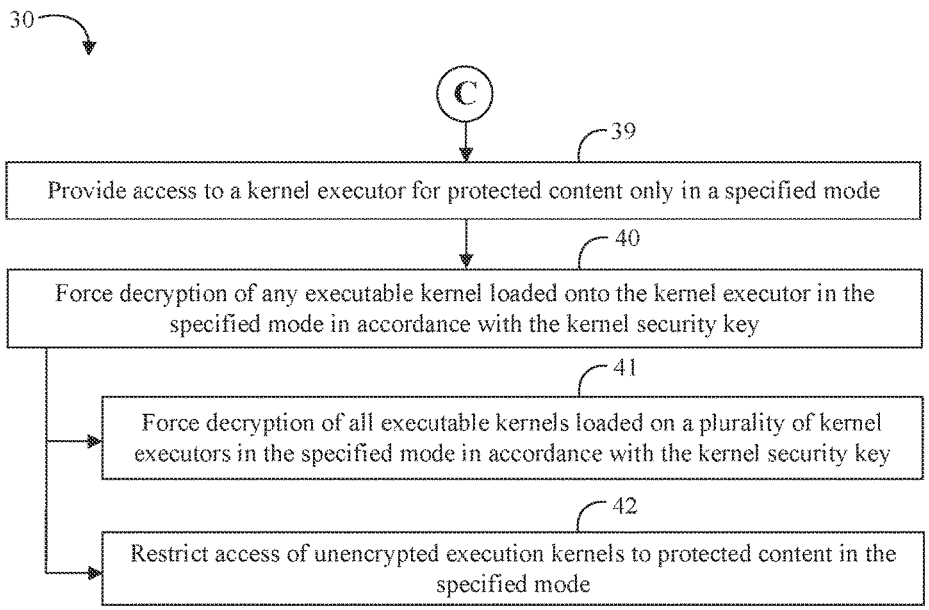
Figure 3D:
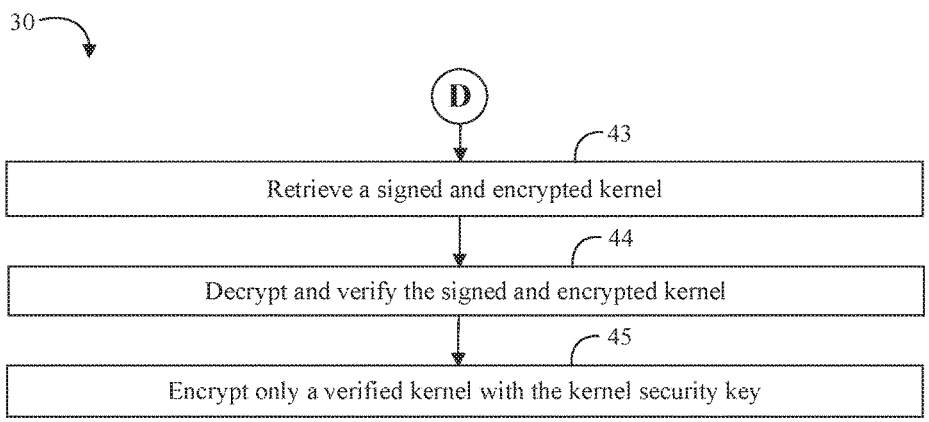

Turning now to FIG. 2, an embodiment of a graphics apparatus 20 may include a graphics processor 21 including a kernel executor 22, and a security engine 23 communicatively coupled to the graphics processor 21. For example, the security engine 23 may be configured to create a kernel security key, encrypt an executable kernel for the kernel executor 22 in accordance with the kernel security key, and share the kernel security key with the graphics processor 21. In some embodiments of the apparatus 20, the security engine 23 may be further configured to decrypt protected content in accordance with a content title key, create a display security key, and share the display security key with the graphics processor 21 and a display engine. The security engine 23 may also be further configured to retrieve a signed and encrypted kernel, decrypt and verify the signed and encrypted kernel, and encrypt only a verified kernel with the kernel security key.

The security engine 23 may be instantiated in any of a variety of ways. For example, the security engine 23 may be physically and/or logically isolated from an untrusted host. The security engine 23 may be logically isolated, for example, through virtualization or separation techniques, such as INTEL virtualization technology (VT) or ARM TRUSTZONE. In addition, or alternatively, the security engine 23 may be implemented on a separate, discrete piece of silicon that is not just physically isolated on the same die, but also isolated by a bus.

In some embodiments, the graphics processor 21 may be further configured to provide access to the kernel executor 22 for protected content only in a specified mode, and force decryption of any executable kernel loaded onto the kernel executor 22 in the specified mode in accordance with the kernel security key. For example, the graphics processor 21 may include a render engine having a plurality of kernel executors 22, and each of the plurality of kernel executors 22 may be forced to decrypt any executable kernel loaded thereon in the specified mode in accordance with the kernel security key. The graphics processor 21 may also be configured to restrict access of unencrypted execution kernels to protected content in the specified mode. For example, the security engine 23 may be communicatively coupled to the graphics processor 21 with a trusted communication path. For example, a path may be trusted if the security engine 23 and the graphics processor 21 share a same die, making the path less vulnerable to interposer attacks. If the security engine 23 and the graphics processor 21 are on separate die, the path may be trusted if cryptographically protected. In any of the embodiments described herein, the executable kernel may be a shader (e.g. a vertex shader, a geometry shader, a hull shader, a tesselator, a domain shader, etc.).

Embodiments of each of the above graphics processor 21, kernel executor 22, security engine 23, and other components of the graphics apparatus 20 may be implemented in hardware, software, or any suitable combination thereof. For example, hardware implementations may include configurable logic such as, for example, PLAs, FPGAs, CPLDs, or in fixed-functionality logic hardware using circuit technology such as, for example, ASIC, CMOS or TTL technology, or any combination thereof.

Alternatively, or additionally, some operational aspects of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object oriented programming language such as PYTHON, PERL, JAVA, SMALLTALK, C++, C# or the like and conventional procedural programming languages, such as the "C" programming language or similar programming languages.

Turning now to FIGS. 3A to 3D, an embodiment of a method 30 of protecting graphics content may include creating a kernel security key at block 31, encrypting an executable kernel in accordance with the kernel security key at block 32, and sharing the kernel security key with a graphics processor at block 33. The method 30 may further include decrypting protected content in accordance with a content title key at block 34, creating a display security key at block 35, and sharing the display security key with the graphics processor and a display engine at block 36. The method 30 may also include providing a trusted communication path to the graphics processor at block 37. For example, the executable kernel may include a shader at block 38.

Some embodiments of the method 30 may further include providing access to a kernel executor for protected content only in a specified mode at block 39, and forcing decryption of any executable kernel loaded onto the kernel executor in the specified mode in accordance with the kernel security key at block 40. For example, the method 30 may include forcing decryption of all executable kernels loaded on a plurality of kernel executors in the specified mode in accordance with the kernel security key at block 41 and/or restricting access of unencrypted execution kernels to protected content in the specified mode at block 42. The method 30 may also further include retrieving a signed and encrypted kernel at block 43, decrypting and verify the signed and encrypted kernel at block 44, and encrypting only a verified kernel with the kernel security key at block 45.

Embodiments of the method 30 may be implemented in an electronic processing system or a graphics apparatus such as, for example, those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object oriented programming language such as PYTHON, PERL, JAVA, SMALLTALK, C++ or the like and conventional procedural programming languages, such as the "C" programming language or similar programming languages. For example, embodiments of the method 30 may be implemented on a computer readable medium as described in connection with Examples 21 to 28 below.

Advantageously, some embodiments may involve running verified kernels on the GPU. For example, some embodiments may enhance the security of protected content while maintaining flexibility to run specific processing kernels on the GPU execution units (EUs). Without being limited to theory of operation or specific use cases, with some new use cases emerging for protected content, the bar for protection may also be increasing. Some systems may remove any protected content access from the GPU pipe completely to provide security for that content. However, with usages like high dynamic range (HDR) and ultra-high definition (UHD), there may be a need to do additional processing on the protected content using the GPU pipe. For example, 4K UHD television (UHDTV) may be 3840 pixels by 2160 pixels, and 8K UHDTV may be 7680 pixels by 4320 pixels. Some embodiments may advantageously maintain flexibility and also provide a higher bar for protection by utilizing encrypted kernels and forcing a decryption on the instruction fetch on the GPU pipe whenever protected content is accessed from the GPU pipe. For example, the kernel may be encrypted with a special key which is only known to a security engine and the GPU.

Figure 4:
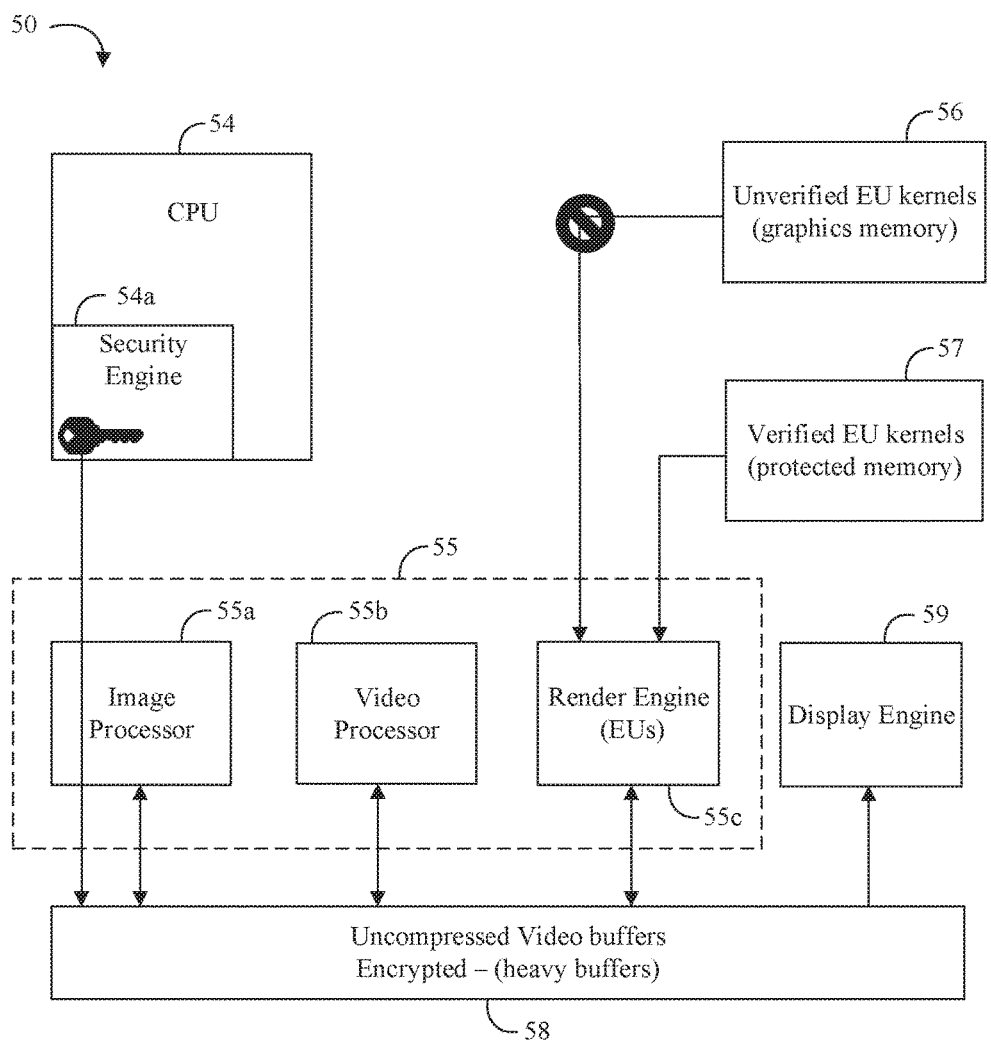
FIG. 4 is a block diagram of another example of an electronic processing system according to an embodiment.

Turning now to FIG. 4, an embodiment of an electronic processing system 50 may include a central processor unit (CPU) 54 communicatively coupled to a graphics engine 55. The CPU 54 may include a security engine 54a. The graphics engine 55 may include an image processor 55a, a video processor 55b, and a render engine 55c. For example, the image processor 55a may include decoders and encoders, such as various codec modules or other fixed function modules. The video processor 55b may include various image enhancement modules. The render engine 55c may include a plurality of EUs. For example, the render engine 55c may be communicatively coupled to load unverified kernels 56 on the EUs (e.g. from graphics memory) and verified kernels 57 (e.g. from protected memory). The CPU 54 and graphics engine 55 may be communicatively coupled to uncompressed video buffers 58, which for protected content may be encrypted (e.g. also known as heavy buffers). A display engine 59 may also be communicatively coupled to the uncompressed video buffers 58.

In accordance with some embodiments, a compressed bitstream may be provided to the graphics engine 55 along with a content title key (e.g. a first security key). The bitstream may subsequently be decrypted and decoded by hardware (e.g. the image processor 55a). The final reconstructed buffers may be put into regular graphics memory (e.g. uncompressed video buffers 58) but are encrypted using a display security key (e.g. a second security key) which is known to both the display engine 59 and the graphics engine 55. Advantageously, the software code (EU kernels) which run on the graphics engine 55 may be forced to be decrypted with a kernel security key (e.g. a third security) which is known only to the security engine 54a and the graphics engine 55. Forcing the decryption of all of the kernels ensures that any unverified EU kernels 56 cannot run on the render engine 55c while at the same time providing flexibility to run the special video processing functions like HDR on content with the higher bar on protection.

In some other systems, the render engine may be accessible when protected content is loaded in the uncompressed video buffers. However, a problem with this arrangement is that unverified kernels may have access to the encrypted content (e.g. which may provide unauthorized access to the content). In other systems, the render engine may not be available when protected content is loaded to provide increased security. However, a problem with this arrangement is that some protected content may benefit from the additional processing power and flexibility provided by the render engine (e.g. HDR and/or UHD content). Advantageously, some embodiments may provide an operating mode for restricting the access of the protected content to only encrypted kernels, thus providing a higher bar of protection while also having the flexibility to utilize additional video processing by the render engine on this content.

In accordance with some embodiments, a special session (e.g. a protected content mode) may be set up where the security engine creates and shares a special key with the GPU that the security engine uses to encrypt the instructions in the kernels. Whenever the GPU comes across the protected content mode session running on the render engine (e.g. part of the GPU engine), the GPU may use the special key and force a decryption of the instructions. Unverified kernels which are not encrypted will not run as expected on the render engine with this approach because the decryption of the unverified kernels results in unrecognizable execution instructions.

Figure 5:
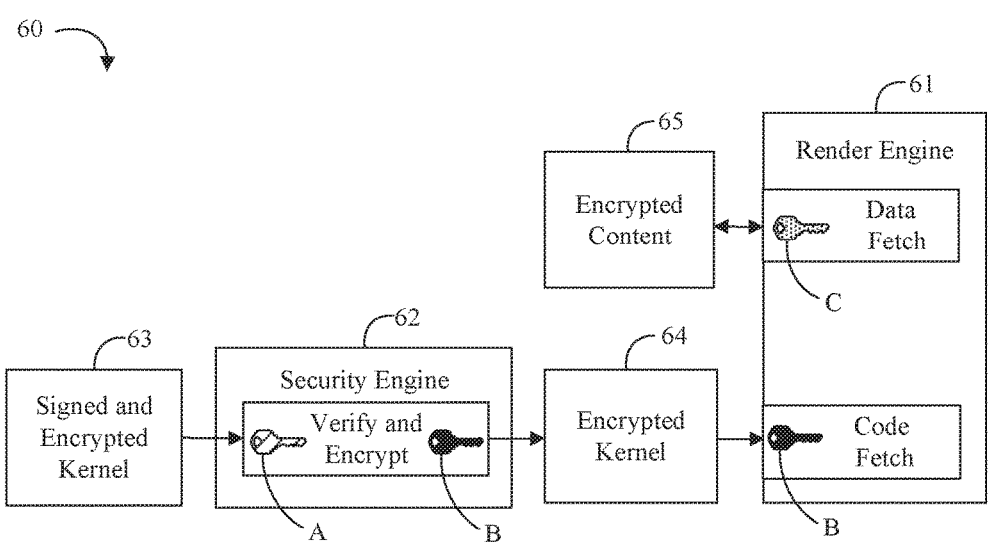
FIG. 5 is a block diagram of another example of a graphics apparatus according to an embodiment.

Turning now to FIG. 5, an embodiment of a graphics apparatus 60 may include a render engine 61 communicatively coupled to a security engine 62. The security engine 62 may retrieve a signed and encrypted kernel 63. For example, the system may include a set of authenticated kernels that are trusted to operate on protected graphics content. For example, a kernel may be developed for HDR tone mapping. During driver build time, the authenticated kernels may be encrypted and signed, for example, using Safe Architecture of Future Emerging (SAFE)-cryptographic algorithms (e.g. with security key A). At run-time, the driver may hand the signed and encrypted kernel 63 to the security engine 62. The security engine 62 may verify the signature and integrity of the kernel using the security key A. In a protected content mode, the security engine may inject, for example, a random advanced encryption standard (AES) key B into the render engine 61 which is only used for kernel-decryption. The security engine 62 may AES-encrypt the kernel with the kernel security key B to provide a newly encrypted kernel 64. In the protected content mode, the render engine 61 may force decryption of all kernels with the key B during code fetch. The forced decryption effectively blocks all other kernels from operating on the protected content in the protected content mode. The protected content itself may be encrypted with a content title key C and the encrypted content 65 may get decrypted by the render engine 61 during data fetch using the key C. Advantageously, some embodiments of the graphics apparatus 60 may maintain security objectives of the protected content while adding support for authenticated kernels/shaders to run on the render engine 61.

Figure 6:
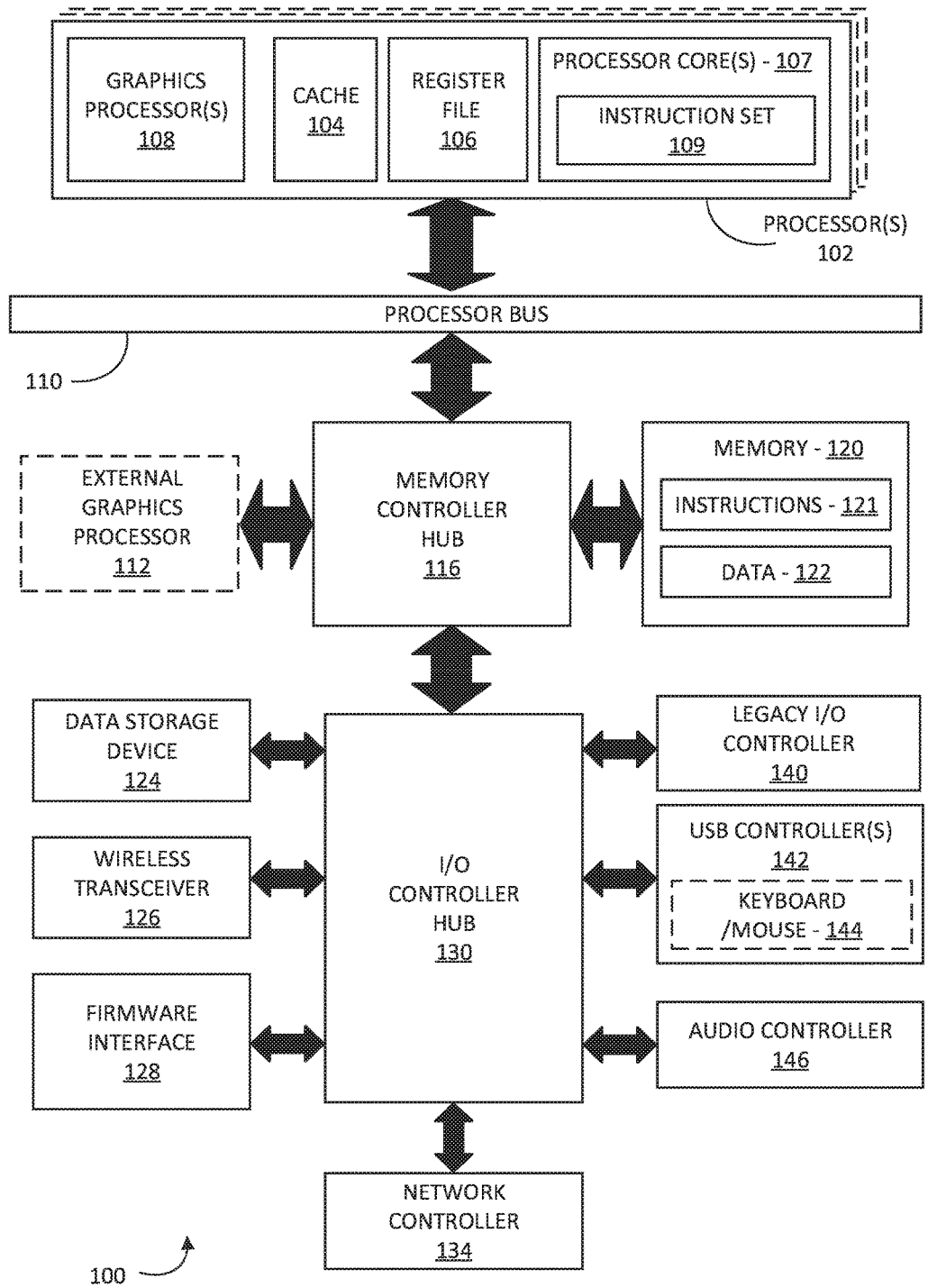
FIG. 6 is a block diagram of an example of an overview of a data processing system according to an embodiment.

FIG. 6 is a block diagram of an example of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments, system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or LLC) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations. In some embodiments of the system 100, one or more of the graphics processor 108 and the external graphics processor 112 may advantageously be communicatively coupled to a security engine (not shown), as described herein, to create a kernel security key, encrypt an executable kernel in accordance with the kernel security key, and share the kernel security key with the graphics processor 108, 112.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 7:
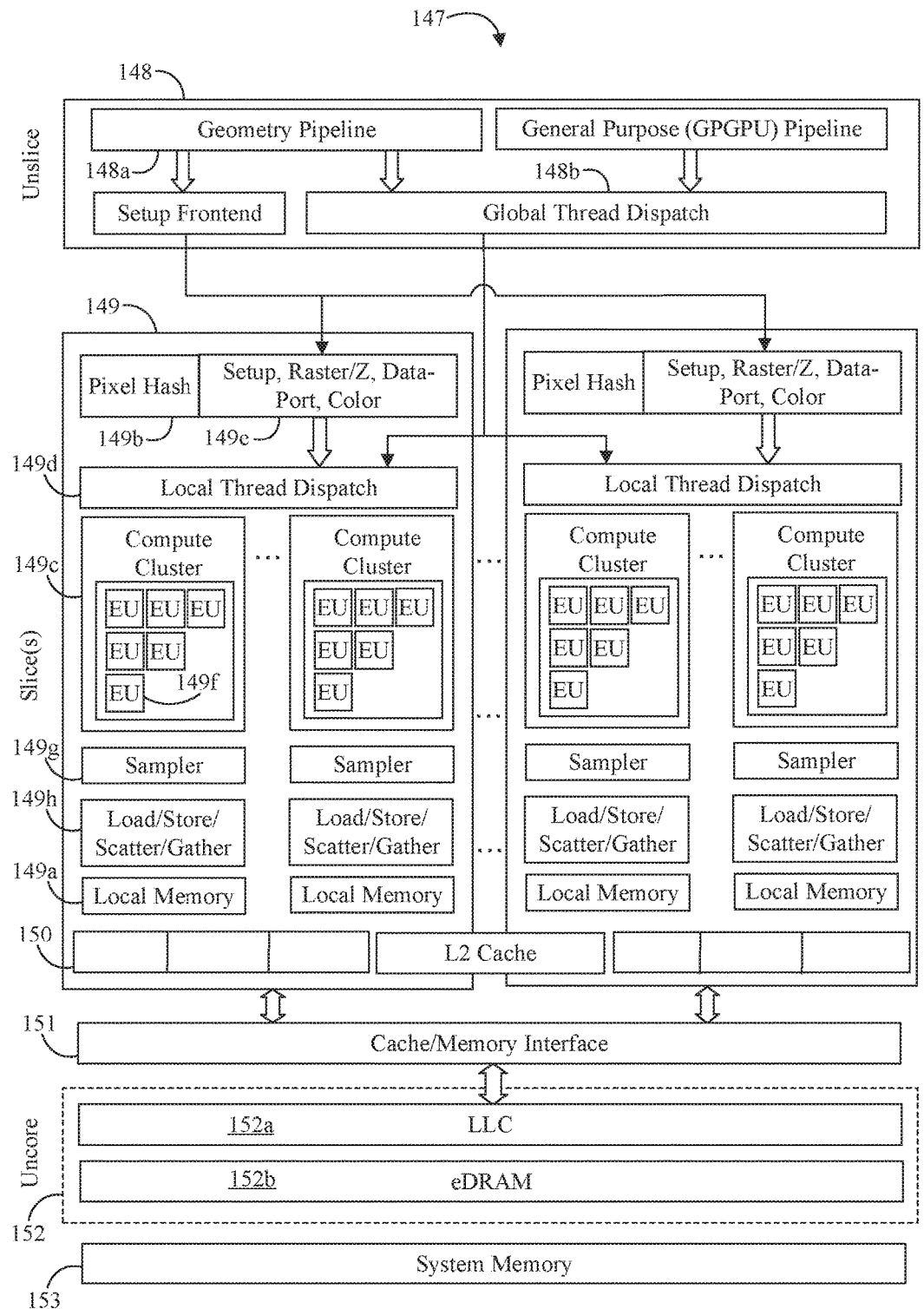
FIG. 7 is a block diagram of an example of a GPU microarchitecture according to an embodiment.

As shown in FIG. 7, a geometry pipeline from a vertex fetcher through a simple cull stage may be provided as geometry pipeline 148a in an unslice portion 148 of a GPU microarchitecture 147. The programmable shaders emanating from the geometry pipe 148a may be dispatched to the local thread processors 149d via global thread dispatch 148b and the computed values may be recorded in the local memory 149a. The passing triangles from the geometry pipe 148a may be shipped to the slices 149 where they may be divided into symmetrical blocks of pixels via the rasterization walk. The pixel blocks may be hashed via the pixel hashing mechanism 149b to decide whether the block is going to be rendered in the slice or not. The hashing mechanism 149b may be responsible not only for the load-balance but also to maintain the pixel-coherency.

As described above, multiple triangles in a 3D scene may overlap and it may be incumbent upon the hashing mechanism 149b to send the pixel block at a given screen coordinate to the same slice 149 as well as the same compute cluster 149c via a local thread dispatch 149d. This may be done in order to maintain the depth and the color coherency of the pixels. Further, the slice portion 149 of the micro architecture may be divided into two functional blocks, namely a pixel pipe 149e and the compute clusters 149c. As described above, the pixel pipe 149e may contain the rasterization, depth and color cluster while the compute cluster 149c may encompass the array of EUs 149f used for executing programmable shaders. Advantageously, in a protected content mode as described herein, each EU 149f may decrypt the shader loaded thereon in accordance with a kernel security key. Each EU 149f may support multiple thread contexts with different single instruction multiple data (SIMD) widths—i.e. 8, 16 or 32 in one embodiment. Internally, an EU 149f may have two pipes that are quad-pumped. Each pipe may have four-stream SIMD processors and may execute both floating point and scalar instructions. Each compute cluster 149c may also have a shared texture-sampling unit 149g and a load/store unit 149h that may do gathered reads as well as scattered writes. In addition, the shared functions may have their own private caches backed up by the unified L2 cache 150 as shown in FIG. 7. Finally, similar architecture generations may try to satisfy diverse market segments, for example, from phone/tablet devices to high-end gaming computers. Thus, similar architecture generations might support products that have different numbers of compute clusters 149c and slices 149.

In some embodiments, the uncore 152 may encompass a cache/memory interface 151, a last level cache(s) (LLCs) 152a as well as the memory 153. Just like the slices 149, the uncore configuration may also be dependent upon the market segment. For example, high end configurations may have a last level cache along with embedded-dynamic random access memory (eDRAM) 152b while the configuration for a phone/tablet may have a memory controller and system memory.

Figure 8:
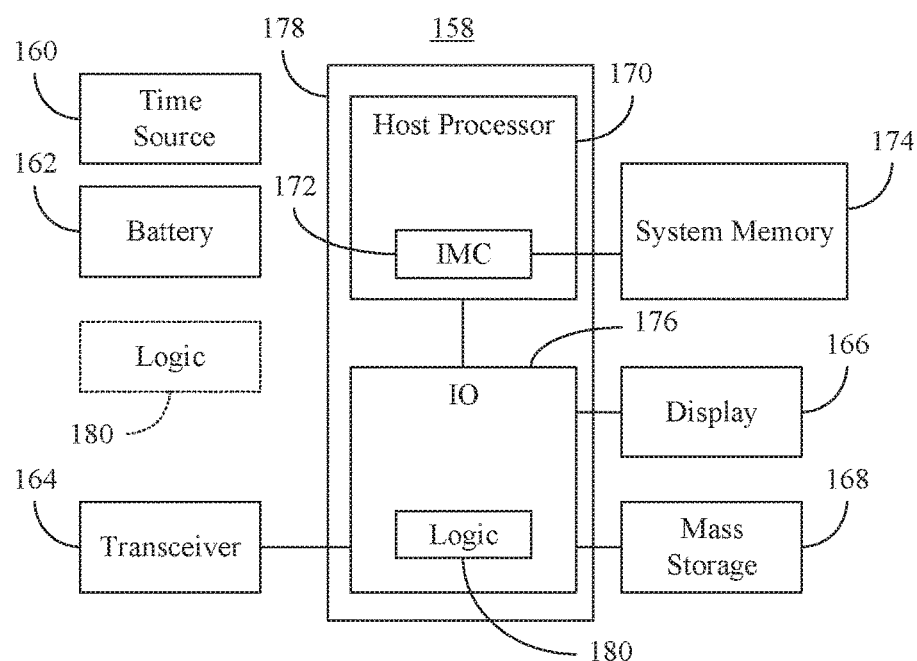
FIG. 8 is a block diagram of an example of a computing device according to an embodiment.

FIG. 8 shows a computing device 158 that may be readily substituted for one or more of the electronic processing system 10 (FIG. 1) and/or the electronic processing system 40 (FIG. 4), already discussed. In the illustrated example, the device 158 includes a time source 160 (e.g., crystal oscillator, clock), a battery 162 to supply power to the device 158, a transceiver 164 (e.g., wireless or wired), a display 166 and mass storage 168 (e.g., hard disk drive/HDD, solid state disk/SSD, optical disk, flash memory). The device 158 may also include a host processor 170 (e.g., CPU) having an integrated memory controller (IMC) 172, which may communicate with system memory 174. The system memory 174 may include, for example, dynamic random access memory (DRAM) configured as one or more memory modules such as, for example, dual inline memory modules (DIMMs), small outline DIMMs (SODIMMs), etc. The illustrated device 158 also includes an input output (IO) module 176 implemented together with the processor 170 on a semiconductor die 178 as a system on chip (SoC), wherein the TO module 176 functions as a host device and may communicate with, for example, the display 166, the transceiver 164, the mass storage 168, and so forth. The mass storage 168 may include non-volatile memory (NVM) that stores one or more keys (e.g., media access control (MAC) generation keys, encryption keys).

The IO module 176 may include logic 180 that causes the semiconductor die 178 to operate as a graphics apparatus such as, for example, graphics apparatus 20 (FIG. 2) and/or the graphics apparatus 60 (FIG. 5). Thus, the logic 180 may create a kernel security key, encrypt an executable kernel in accordance with the kernel security key, and share the kernel security key with a graphics processor (e.g. which may be part of IO module 176). The logic 180 may further decrypt protected content in accordance with a content title key, create a display security key, and share the display security key with the graphics processor and a display engine (e.g. a display controller for the display 166). The logic 180 may also provide access to a kernel executor for protected content only in a specified mode, and force decryption of any executable kernel loaded onto the kernel executor in the specified mode in accordance with the kernel security key. For example, the executable kernel may comprise a shader. In one example, the time source 160 is autonomous/independent from the controller in order to enhance security (e.g., to prevent the controller from tampering with cadence, frequency, latency and/or timestamp data). The logic 180 may also be implemented elsewhere in the device 158.

Figure 9:
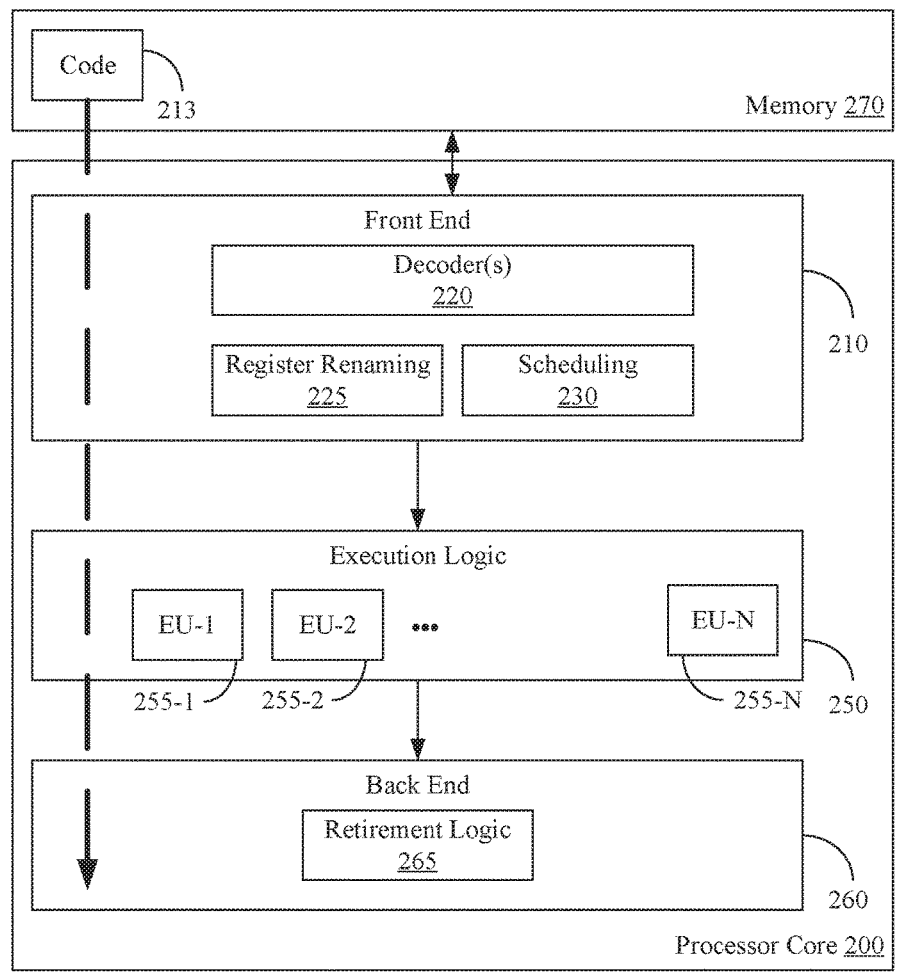
FIG. 9 is a block diagram of an example of a processor according to an embodiment.

FIG. 9 illustrates a processor core 200 according to one embodiment. The processor core 200 may be the core for any type of processor, such as a micro-processor, an embedded processor, a digital signal processor (DSP), a network processor, a graphics processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 30 (FIGS. 3A to 3D), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units (EU) 255-1 through 255-N. Advantageously, in a protected content mode as described herein, each EU 255-1 through 255-N may decrypt the executable instructions loaded thereon in accordance with a kernel security key. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 10:
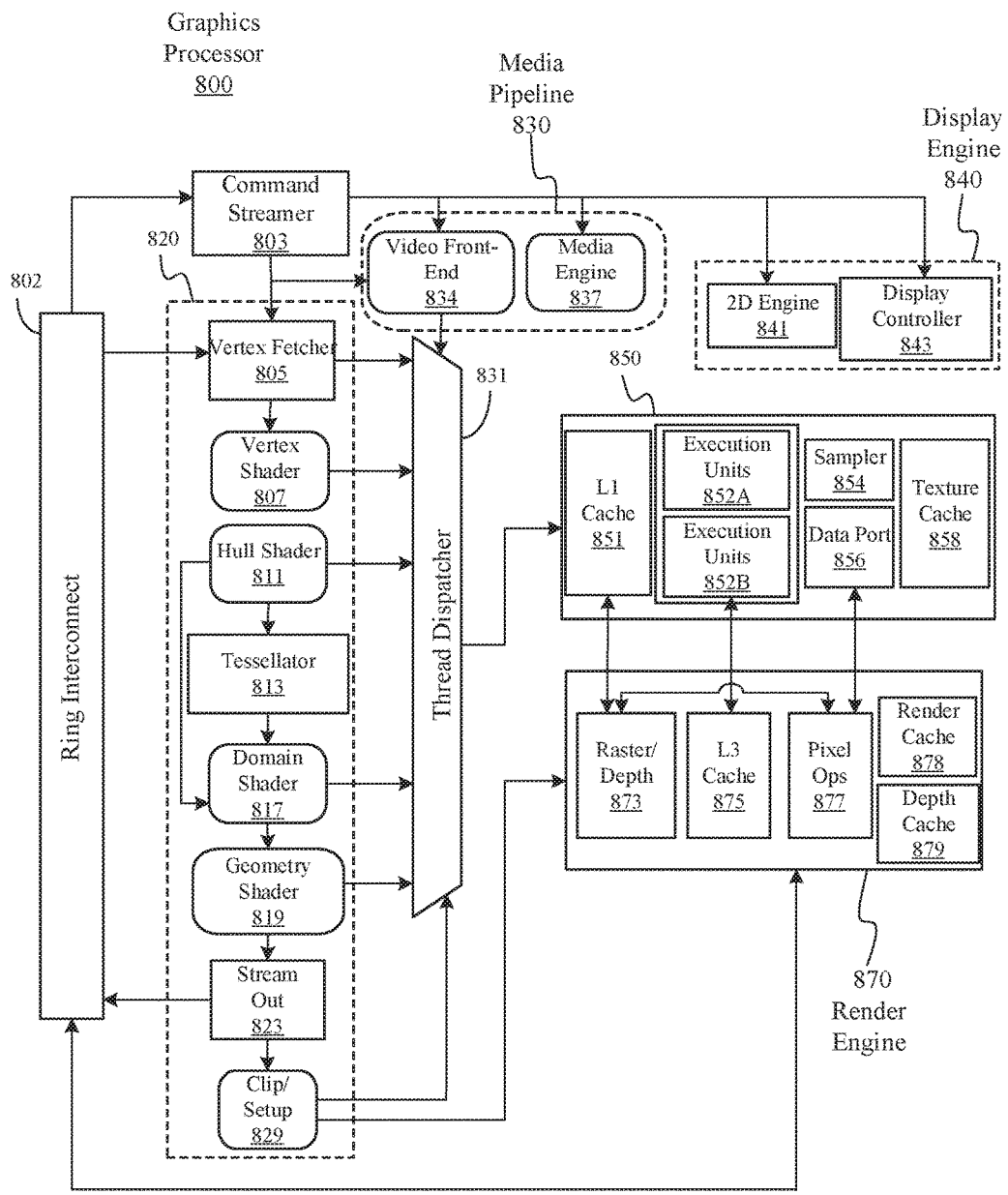
FIG. 10 is a block diagram of an example of a graphics pipeline according to an embodiment.

FIG. 10 is a block diagram of another embodiment of a graphics processor 800. In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. Advantageously, in a protected content mode as described herein, each EU 852A, 852B may decrypt the instructions loaded thereon in accordance with a kernel security key. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled, the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer/depth 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Figure 11:
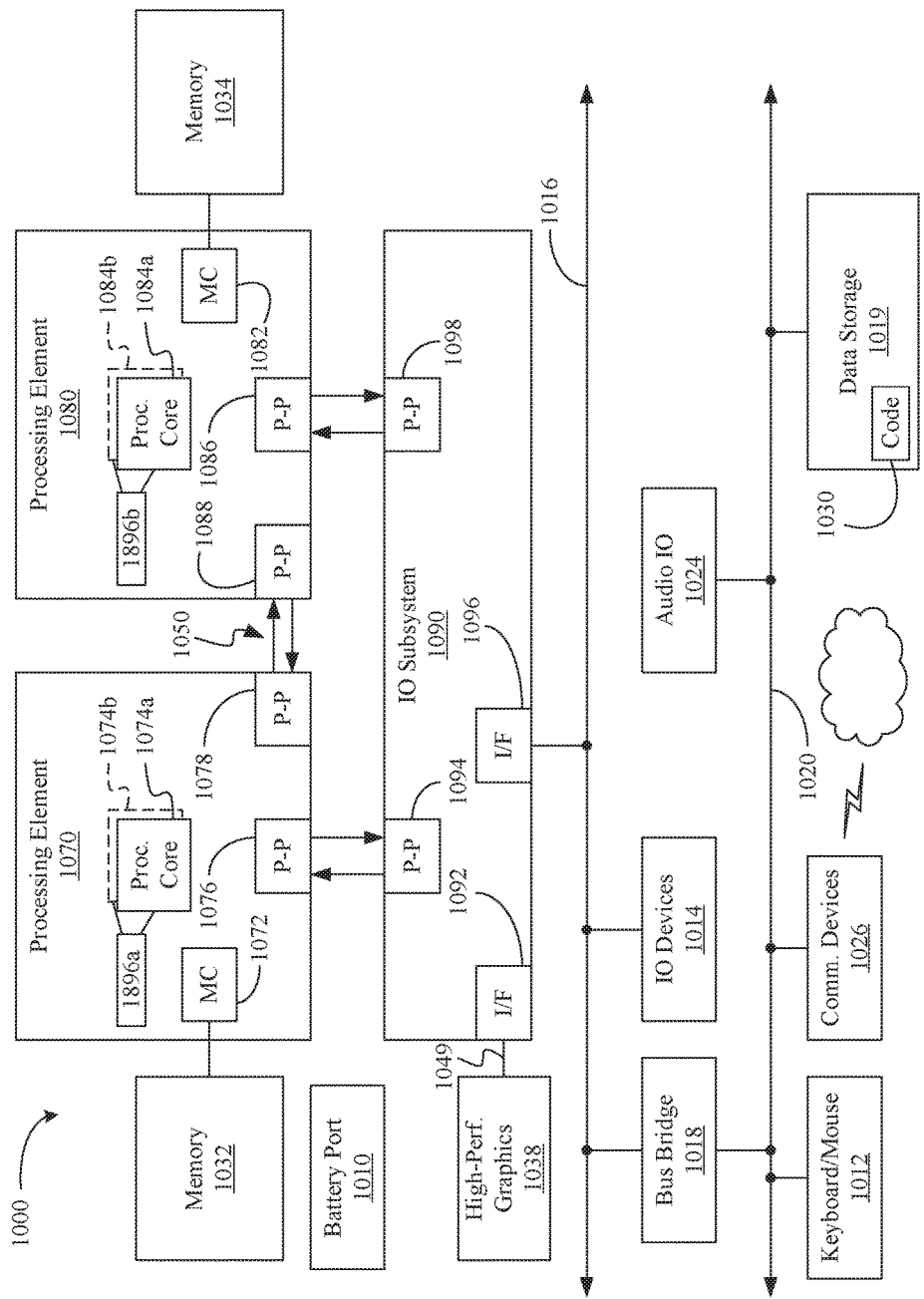
FIG. 11 is a block diagram of an example of a computing system according to an embodiment.

Referring now to FIG. 11, shown is a block diagram of a computing system 1000 embodiment in accordance with an embodiment. Shown in FIG. 11 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 11 may be implemented as a multi-drop bus rather than point-to-point interconnect.

As shown in FIG. 11, each of processing elements 1070 and 1080 may be multicore processors, including first and second processor cores (i.e., processor cores 1074*a* and 1074*b* and processor cores 1084*a* and 1084*b*). Such cores 1074*a*, 1074*b*, 1084*a*, 1084*b* may be configured to execute instruction code in a manner similar to that discussed above in connection with FIG. 9.

Each processing element 1070, 1080 may include at least one shared cache 1896*a*, 1896*b*. The shared cache 1896*a*, 1896*b* may store data (e.g., instructions) that are utilized by one or more components of the processor, such as the cores 1074*a*, 1074*b* and 1084*a*, 1084*b*, respectively. For example, the shared cache 1896*a*, 1896*b* may locally cache data stored in a memory 1032, 1034 for faster access by components of the processor. In one or more embodiments, the shared cache 1896*a*, 1896*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments is not so limited. In other embodiments, one or more additional processing elements may be present in a given processor. Alternatively, one or more of processing elements

1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 11, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 11, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components. In some embodiments of the system 1000, the graphics engine 1038 may advantageously be communicatively coupled to a security engine (not shown), as described herein, to create a kernel security key, encrypt an executable kernel in accordance with the kernel security key, and share the kernel security key with the graphics engine 1038.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments is not so limited.

As shown in FIG. 11, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 30 (FIGS. 3A to 3D), already discussed, and may be similar to the code 213 (FIG. 9), already discussed. Further, an audio I/O 1024 may be coupled to second bus 1020 and a battery port 1010 may supply power to the computing system 1000.

Note that other embodiments are contemplated. For example, instead of the point-to-point architecture of FIG. 11, a system may implement a multi-drop bus or another such communication topology. Also, the elements of FIG. 11 may alternatively be partitioned using more or fewer integrated chips than shown in FIG. 11.

Figure 12:
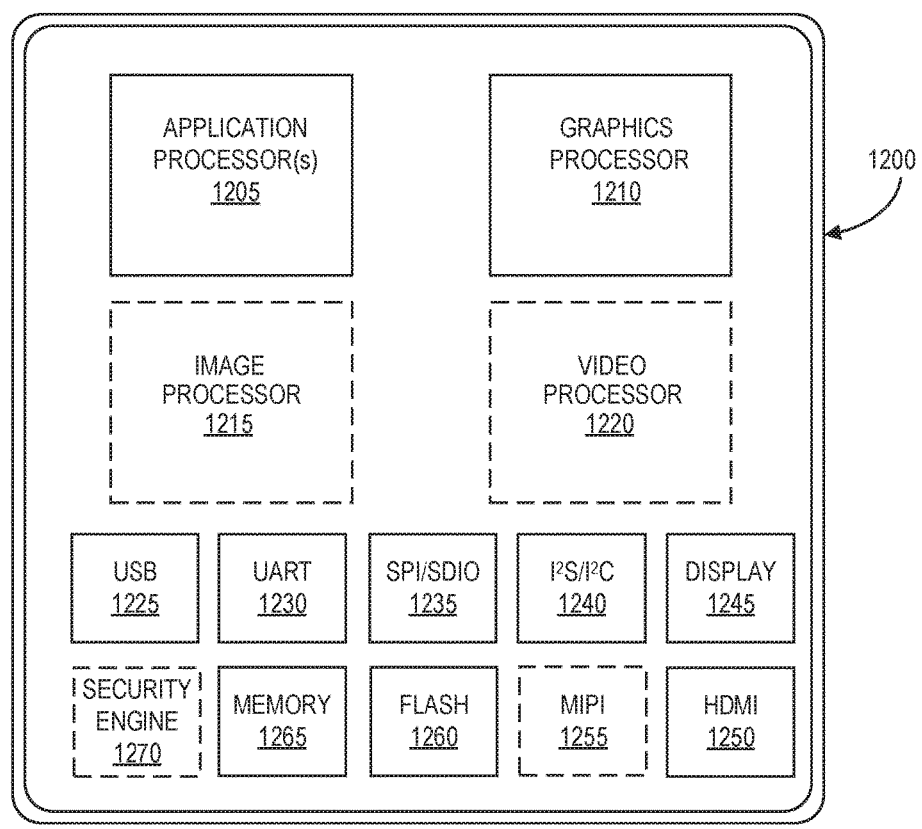
FIG. 12 is a block diagram of an example of a system on a chip integrated circuit according to an embodiment.

FIG. 12 is a block diagram illustrating an exemplary system on a chip (SOC) integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, universal asynchronous receiver/transmitter (UART) controller 1230, a serial peripheral interface (SPI)/secure digital input output (SDIO) controller 1235, and an integrated interchip sound (I2S)/inter-integrated circuit (I2C) controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

In some embodiments of the SOC 1200, the graphics processor 1210 may be communicatively coupled to the application processor 1205, and the graphics processor 1210 may include a kernel executor. A display engine (not shown) may be communicatively coupled to the graphics processor 1210 and the display 1245, and the security engine 1270 may be communicatively coupled to the graphics processor 1210 and the display engine. For example, the security engine 1270 may be configured to decrypt protected content in accordance with a content title key, create a display security key, share the display security key with the graphics processor 1210 and the display engine, create a kernel security key, encrypt an executable kernel for the kernel executor in accordance with the kernel security key, and share the kernel security key with the graphics processor 1270.

In some embodiments of the SOC 1200, the graphics processor 1210 may be further configured to provide access to the kernel executor for protected content only in a specified mode, and force decryption of any executable kernel loaded onto the kernel executor in the specified mode in accordance with the kernel security key. For example, the graphics processor 1210 may include a render engine having a plurality of kernel executors, and each of the plurality of kernel executors may be forced to decrypt any executable kernel loaded thereon in the specified mode in accordance with the kernel security key.

The graphics processor 1210 may also be configured to restrict access of unencrypted execution kernels to protected content in the specified mode. For example, the security engine 1270 may be communicatively coupled to the graphics processor 1210 with a trusted communication path. For example, the path may be trusted because the security engine 1270 and the graphics processor 1210 share a same die, making the path less vulnerable to interposer attacks. The executable kernel may be a set of instructions that implements a shader (e.g. a vertex shader, a geometry shader, a hull shader, a tesselator, a domain shader, etc.).

Additionally, other logic and circuits may be included in the processor of integrated circuit 1200, including additional graphics processors/cores, peripheral interface controllers, or general purpose processor cores.

ADDITIONAL NOTES AND EXAMPLES

Example 1 may include an electronic processing system, comprising an application processor, a graphics processor communicatively coupled to the application processor, the graphics processor including a kernel executor, a display engine communicatively coupled to the graphics processor, and a security engine communicatively coupled to the graphics processor and the display engine, wherein the security engine is to decrypt protected content in accordance with a content title key, create a display security key, share the display security key with the graphics processor and the display engine, create a kernel security key, encrypt an executable kernel for the kernel executor in accordance with the kernel security key, and share the kernel security key with the graphics processor.

Example 2 may include the system of Example 1, wherein the graphics processor is further to provide access to the kernel executor for protected content only in a specified mode, and force decryption of any executable kernel loaded onto the kernel executor in the specified mode in accordance with the kernel security key.

Example 3 may include the system of any of Examples 1 to 2, wherein the graphics processor includes a render engine having a plurality of kernel executors, and wherein each of the plurality of kernel executors is forced to decrypt any executable kernel loaded thereon in the specified mode in accordance with the kernel security key.

Example 4 may include the system of any of Examples 1 to 2, wherein the security engine is further to retrieve a signed and encrypted kernel, decrypt and verify the signed and encrypted kernel, and encrypt only a verified kernel with the kernel security key.

Example 5 may include a graphics apparatus, comprising a graphics processor including a kernel executor, and a security engine communicatively coupled to the graphics processor, wherein the security engine is to create a kernel security key, encrypt an executable kernel for the kernel executor in accordance with the kernel security key, and share the kernel security key with the graphics processor.

Example 6 may include the apparatus of Example 5, wherein the security engine is further to decrypt protected content in accordance with a content title key, create a display security key, and share the display security key with the graphics processor and a display engine.

Example 7 may include the apparatus of Example 5, wherein the security engine is further to retrieve a signed and encrypted kernel, decrypt and verify the signed and encrypted kernel, and encrypt only a verified kernel with the kernel security key.

Example 8 may include the apparatus of Example 5, wherein the graphics processor is further to provide access to the kernel executor for protected content only in a specified mode, and force decryption of any executable kernel loaded onto the kernel executor in the specified mode in accordance with the kernel security key.

Example 9 may include the apparatus of Example 8, wherein the graphics processor includes a render engine having a plurality of kernel executors, and wherein each of the plurality of kernel executors is forced to decrypt any executable kernel loaded thereon in the specified mode in accordance with the kernel security key.

Example 10 may include the apparatus of Example 8, wherein the graphics processor is further to restrict access of unencrypted execution kernels to protected content in the specified mode.

Example 11 may include the apparatus of any of Examples 5 to 10, further wherein the security engine is communicatively coupled to the graphics processor with a trusted communication path.

Example 12 may include the apparatus of any of Examples 5 to 10, wherein the executable kernel comprises a shader.

Example 13 may include a method of protecting graphics content, comprising creating a kernel security key, encrypting an executable kernel in accordance with the kernel security key, and sharing the kernel security key with a graphics processor.

Example 14 may include the method of Example 13, further comprising decrypting protected content in accordance with a content title key, creating a display security key, and sharing the display security key with the graphics processor and a display engine.

Example 15 may include the method of Example 13, further comprising retrieving a signed and encrypted kernel, decrypting and verify the signed and encrypted kernel, and encrypting only a verified kernel with the kernel security key.

Example 16 may include the method of Example 13, further comprising providing access to a kernel executor for protected content only in a specified mode, and forcing decryption of any executable kernel loaded onto the kernel executor in the specified mode in accordance with the kernel security key.

Example 17 may include the method of Example 16, further comprising forcing decryption of all executable kernels loaded on a plurality of kernel executors in the specified mode in accordance with the kernel security key.

Example 18 may include the method of Example 16, further comprising restricting access of unencrypted execution kernels to protected content in the specified mode.

Example 19 may include the method of any of Examples 13 to 18, further comprising providing a trusted communication path to the graphics processor.

Example 20 may include the method of any of Examples 13 to 18, wherein the executable kernel comprises a shader.

Example 21 may include at least one computer readable medium, comprising a set of instructions, which when executed by a computing device, cause the computing device to create a kernel security key, encrypt an executable kernel in accordance with the kernel security key, and share the kernel security key with a graphics processor.

Example 22 may include the at least one computer readable medium of Example 21, comprising a further set of instructions, which when executed by the computing device, cause the computing device to decrypt protected content in accordance with a content title key, create a display security key, and share the display security key with the graphics processor and a display engine.

Example 23 may include the at least one computer readable medium of Example 21, comprising a further set of instructions, which when executed by the computing device, cause the computing device to retrieve a signed and encrypted kernel, decrypt and verify the signed and encrypted kernel, and encrypt only a verified kernel with the kernel security key.

Example 24 may include the at least one computer readable medium of Example 21, comprising a further set of instructions, which when executed by the computing device, cause the computing device to provide access to a kernel executor for protected content only in a specified mode, and force decryption of any executable kernel loaded onto the kernel executor in the specified mode in accordance with the kernel security key.

Example 25 may include the at least one computer readable medium of Example 24, comprising a further set of instructions, which when executed by the computing device, cause the computing device to force decryption of all executable kernels loaded on a plurality of kernel executors in the specified mode in accordance with the kernel security key.

Example 26 may include the at least one computer readable medium of Example 24, comprising a further set of instructions, which when executed by the computing device, cause the computing device to restrict access of unencrypted execution kernels to protected content in the specified mode.

Example 27 may include the at least one computer readable medium of any of Examples 21 to 26, comprising a further set of instructions, which when executed by the computing device, cause the computing device to provide a trusted communication path to the graphics processor.

Example 28 may include the at least one computer readable medium of any of Examples 21 to 26, wherein the executable kernel comprises a shader.

Example 29 may include a graphics apparatus, comprising means for creating a kernel security key, means for encrypting an executable kernel in accordance with the kernel security key, and means for sharing the kernel security key with a graphics processor.

Example 30 may include the graphics apparatus of Example 29, further comprising means for decrypting protected content in accordance with a content title key, means for creating a display security key, and means for sharing the display security key with the graphics processor and a display engine.

Example 31 may include the graphics apparatus of Example 29, further comprising means for retrieving a signed and encrypted kernel, means for decrypting and verify the signed and encrypted kernel, and means for encrypting only a verified kernel with the kernel security key.

Example 32 may include the graphics apparatus of Example 29, further comprising means for providing access to a kernel executor for protected content only in a specified mode, and means for forcing decryption of any executable kernel loaded onto the kernel executor in the specified mode in accordance with the kernel security key.

Example 33 may include the graphics apparatus of Example 32, further comprising means for forcing decryption of all executable kernels loaded on a plurality of kernel executors in the specified mode in accordance with the kernel security key.

Example 34 may include the graphics apparatus of Example 32, further comprising means for restricting access of unencrypted execution kernels to protected content in the specified mode.

Example 35 may include the graphics apparatus of any of Examples 29 to 34, further comprising means for providing a trusted communication path to the graphics processor.

Example 36 may include the graphics apparatus of any of Examples 29 to 34, wherein the executable kernel comprises a shader.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:
1. An electronic processing system, comprising:
an application processor;
a graphics processor communicatively coupled to the application processor, the graphics processor including a kernel executor, wherein in a specified mode, the kernel executor is to force decryption of any executable kernel loaded on the kernel executor in accordance with a kernel security key;

a display engine communicatively coupled to the graphics processor; and a security engine communicatively coupled to the graphics processor and the display engine, wherein the security engine is to:
 decrypt protected content in accordance with a content title key,
 create a display security key,
 share the display security key with the graphics processor and the display engine,
 create the kernel security key,
 retrieve a signed and encrypted kernel that is encrypted according to a first security key, wherein the first security key is different from the kernel security key,
 decrypt and verify the signed and encrypted kernel according to the first security key,
 encrypt the decrypted and verified kernel in accordance with the kernel security key to generate a newly encrypted kernel that is to be loaded onto the kernel executor, and
 share the kernel security key with the graphics processor.

2. The system of claim 1, wherein the graphics processor is further to:
 provide access to the kernel executor for protected content only in the specified mode.

3. The system of claim 1, wherein the graphics processor includes a render engine having a plurality of kernel executors, and wherein each of the plurality of kernel executors is forced to decrypt any executable kernel loaded thereon in the specified mode in accordance with the kernel security key.

4. The system of claim 1, wherein in the specified mode the kernel executor is to force decryption of an unverified kernel in accordance with the kernel security key so that the unverified kernel is decrypted into execution instructions that are unrecognizable by the graphics processor to block the unverified kernel from operating on the graphics processor.

5. The system of claim 4, wherein the unverified kernel is unencrypted.

6. A graphics apparatus, comprising:
a graphics processor including a kernel executor, wherein in a specified mode, the kernel executor is to force decryption of any executable kernel loaded on the kernel executor in accordance with a kernel security key; and
a security engine communicatively coupled to the graphics processor, wherein the security engine is to:
 decrypt protected content in accordance with a content title key;
 create a display security key;
 share the display security key with the graphics processor and a display engine;
 create the kernel security key;
 retrieve a signed and encrypted kernel that is encrypted according to a first security key, wherein the first security key is different from the kernel security key;
 decrypt and verify the signed and encrypted kernel according to the first security key;
 encrypt the decrypted and verified kernel in accordance with the kernel security key to generate a newly encrypted kernel that is to be loaded onto the kernel executor; and
 share the kernel security key with the graphics processor.

7. The apparatus of claim 5, wherein the graphics processor is further to:
 provide access to the kernel executor for protected content only in the specified mode.

8. The apparatus of claim 7, wherein the graphics processor includes a render engine having a plurality of kernel executors, and wherein each of the plurality of kernel executors is forced to decrypt any executable kernel loaded thereon in the specified mode in accordance with the kernel security key.

9. The apparatus of claim 7, wherein the graphics processor is further to:
 restrict access of unencrypted execution kernels to protected content in the specified mode.

10. The apparatus of claim 6, further wherein the security engine is communicatively coupled to the graphics processor with a trusted communication path.

11. The apparatus of claim 6, wherein the signed and encrypted kernel comprises a shader.

12. A method of protecting graphics content, comprising:
 decrypting protected content in accordance with a content title key;
 creating a display security key;
 sharing the display security key with a graphics processor and a display engine;
 creating a kernel security key;
 retrieving a signed and encrypted kernel that is encrypted according to a first security key, wherein the first security key is different from the kernel security key;
 decrypting and verifying the signed and encrypted kernel according to the first security key;
 encrypting the decrypted and verified kernel in accordance with the kernel security key to generate a newly encrypted kernel that is to be loaded onto a kernel executor of the graphics processor, wherein in a specified mode, the kernel executor is to force decryption of any executable kernel loaded on the kernel executor in accordance with the kernel security key; and
 sharing the kernel security key with the graphics processor.

13. The method of claim 12, further comprising:
 providing access to the kernel executor for protected content only in the specified mode; and
 forcing decryption of any executable kernel loaded onto the kernel executor in the specified mode in accordance with the kernel security key.

14. The method of claim 13, further comprising:
 forcing decryption of all executable kernels loaded on a plurality of kernel executors in the specified mode in accordance with the kernel security key.

15. The method of claim 13, further comprising:
 restricting access of unencrypted execution kernels to protected content in the specified mode.

16. The method of claim 12, further comprising:
 providing a trusted communication path to the graphics processor.

17. The method of claim 12, wherein the signed and encrypted kernel comprises a shader.

18. At least one non-transitory computer readable medium, comprising a set of instructions, which when executed by a computing device, cause the computing device to perform operations comprising:

decrypt protected content in accordance with a content title key;
create a display security key;
share the display security key with a graphics processor and a display engine;
create a kernel security key;
retrieve a signed and encrypted kernel that is encrypted according to a first security key, wherein the first security key is different from the kernel security key;
decrypt and verify the signed and encrypted kernel according to the first security key;
encrypt the decrypted and verified kernel in accordance with the kernel security key to generate a newly encrypted kernel that is to be loaded onto a kernel executor of the graphics processor, wherein in a specified mode, the kernel executor is to force decryption of any executable kernel loaded on the kernel executor in accordance with the kernel security key; and
share the kernel security key with the graphics processor.

19. The at least one non-transitory computer readable medium of claim 18, comprising a further set of instructions, which when executed by the computing device, cause the computing device to perform operations comprising:
provide access to the kernel executor for protected content only in the specified mode; and
force decryption of any executable kernel loaded onto the kernel executor in the specified mode in accordance with the kernel security key.

20. The at least one non-transitory computer readable medium of claim 19, comprising a further set of instructions, which when executed by the computing device, cause the computing device to perform operations comprising:
force decryption of all executable kernels loaded on a plurality of kernel executors in the specified mode in accordance with the kernel security key.

* * * * *

UNITED STATES PATENT AND TRADEMARK OFFICE
CERTIFICATE OF CORRECTION

PATENT NO. : 10,367,639 B2
APPLICATION NO. : 15/394324
DATED : July 30, 2019
INVENTOR(S) : Vembu et al.

It is certified that error appears in the above-identified patent and that said Letters Patent is hereby corrected as shown below:

In the Claims

At Column 20, Claim number 7, Line number 6, delete "claim 5," and insert --claim 6,--

Signed and Sealed this
Nineteenth Day of November, 2019

Andrei Iancu
*Director of the United States Patent and Trademark Office*